May 9, 1967     F. F. LIU     3,318,148
MASS FLOWMETER
Filed June 7, 1965     2 Sheets-Sheet 1
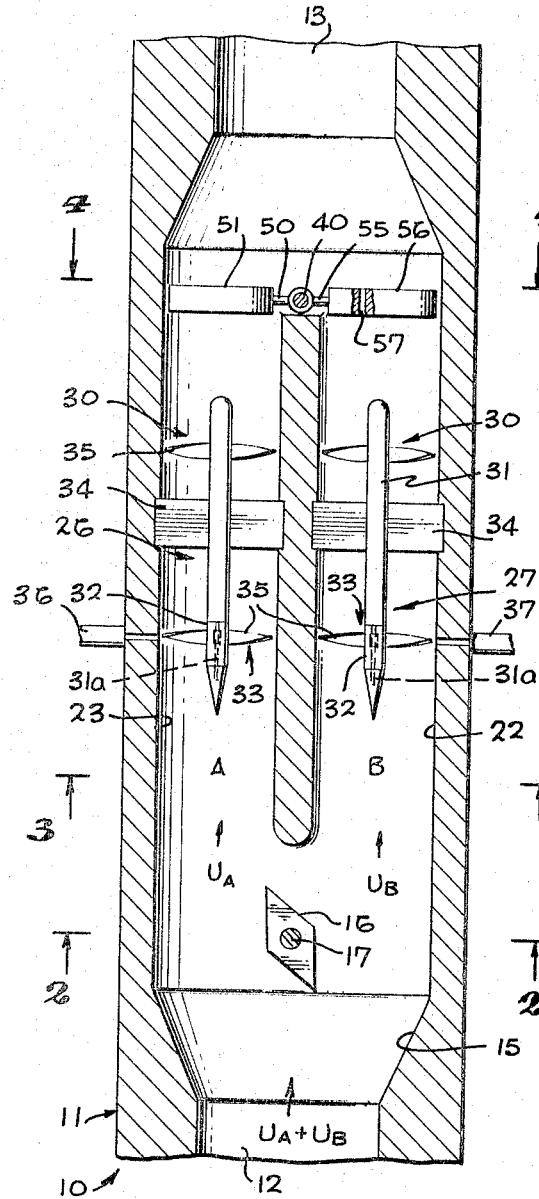
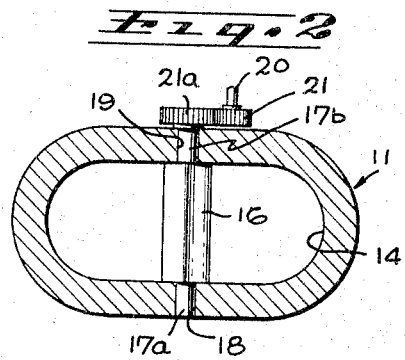
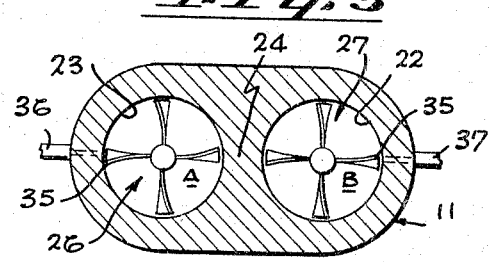
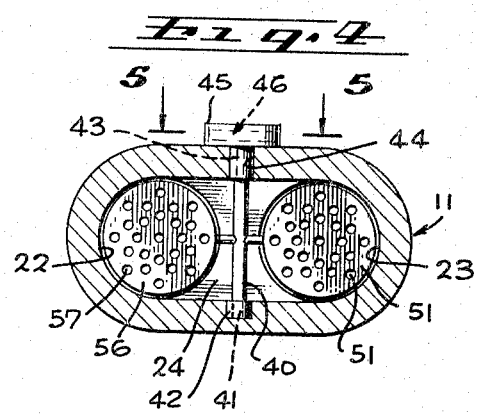
FREDERICK F. LIU
INVENTOR
BY R. E. Geangue
ATTORNEY

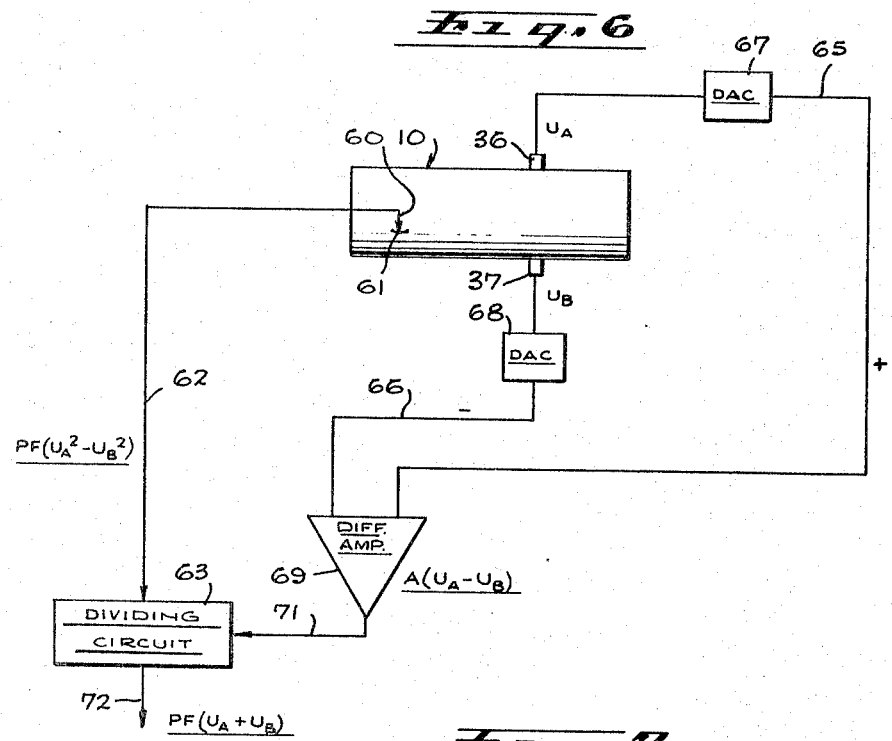
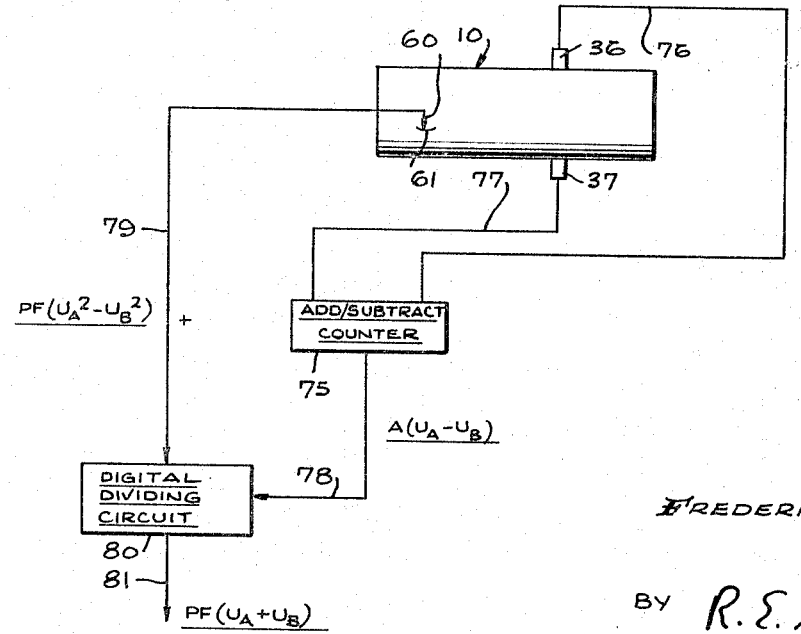

United States Patent Office 3,318,148
Patented May 9, 1967

3,318,148
MASS FLOWMETER
Frederick F. Liu, Northridge, Calif., assignor to Quantum Dynamics, Inc., Tarzana, Calif., a corporation of California
Filed June 7, 1965, Ser. No. 461,646
14 Claims. (Cl. 73—231)

This invention relates to a mass flowmeter and more particularly to a mass flowmeter based on the differential flow principle in which the flow to be measured is divided into separate streams having different flow velocities.

While prior flow meters have incorporated divided flow for one purpose or another, the attainment of a measure of mass flow as in the present invention has not been accomplished. In one form of the present invention, the total flow is directed into two channels by an adjustable vane and a volume flowmeter in each channel provides for measurement of differential flow velocity. Also, downstream of each flowmeter is located an impedance device which is subjected to a fluid force proportional to fluid density and these impedance devices provide a differential force measurement. By combining the valves of differential velocity and differential force, the measure of mass flow rate is obtained. The utilization of the differential principle provides a flowmeter which is less affected by temperature and ambient effects, such as external vibration and acceleration. Also, the device is a multiple purpose flowmeter which, in addition to measuring mass flow, can provide measures of fluid density, volumetric flowrate in each channel, and total volumetric flowrate. Electronic solution of the fluid flow equations can be accomplished for a steady state condition in which the dividing vane is permanently set or for an alternating differential flow in which the dividing vane is continuously rotated.

It is therefore an object of the present invention to provide a mass flowmeter in which the flow is divided into separate channels having different volumetric flows.

Another object of the present invention is to provide a mass flowmeter in which the measure of the mass flow is obtained from values of differential flow velocity and differential fluid force existing between separate streams resulting from division of the total fluid flow.

A further object of the invention is to provide a mass flowmeter in which the total fluid flow is divided into two separate channels, each containing a velocity flowmeter and a fluid impedance.

These and other objects of the invention not specifically set forth above will become readily apparent from the accompanying description and drawings in which:

FIGURE 1 is a horizontal section through the flowmeter of the present invention showing the flow divided between two channels;

FIGURE 2 is a sectional view along line 2—2 of FIGURE 1 illustrating the vane for dividing the fluid flow;

FIGURE 3 is a sectional view along line 3—3 of FIGURE 2 of the measuring turbines in the channels;

FIGURE 4 is a sectional view along line 4—4 of the flow impedances in the channels;

FIGURE 5 is a horizontal section along line 5—5 of FIGURE 4 showing the restraining spring and potentiometer;

FIGURE 6 is a schematic circuit for obtaining mass flow when analogue signals are employed; and FIGURE 7 is a schematic circuit for obtaining mass flow when alternating signals are desired.

Referring to the embodiment of the invention chosen for purposes of illustration, the mass flowmeter 10 comprises a casing 11 which has an inlet fluid passage 12 and an outlet fluid passage 13, both of circular cross section. The passage 12 is connected with an expanded passage section 14 by means of a tapered passage section 15 and the section 14 contains a regulating vane 16 of diamond shape cross section mounted on a shaft 17. End 17a of the shaft is supported for rotation within cavity 18 in casing 11 while end 17b of the shaft passes snugly through opening 19 in the casing and is connected to an external shaft 20 through gears 21 and 21a.

Downstream of the vane 16, the casing 11 is divided into two passages 22 and 23 by casing partition 24 in order to define separate channels A and B, respectively, for dividing the fluid which enters the flowmeter at inlet 12. By varying the position of vane 16, the difference in flow velocity through the two channels can be varied and with the vane in the position shown in FIGURE 1, more flow is directed through channel B.

Channel A contains a turbine flowmeter 26 which measures the flow velocity $U_A$ through channel A and channel B contains a turbine flowmeter 27 which measures the flow velocity $U_B$ through channel B. Each of the flowmeters, which are show diagrammatically as the meter of U.S. Patent 3,135,116, utilize a first turbine 30 mounted on a shaft 31 having extension 31a for supporting the rotor hub 32 for a second turbine 33. The shaft 31 for each turbine 30 is supported by stationary vanes 34 and each turbine has a plurality of blades 35. The blades of each turbine 33 are magnetized and standard magnetic pick-ups 36 and 37 are mounted on casing 11 opposite the turbine 31 for flowmeters 26 and 27, respectively, to sense the passage of each blade in order to measure the speed of each turbine which represents the flow velocities $U_A$ and $U_B$. The flowmeters 26 and 27 are capable of very accurate flow measurement for liquid, gases and cryogenic fluids but these flowmeters can be replaced with more conventional, single rotor types of turbine flowmeters.

A shaft 40 is located at the end of casing divider section 24 and has an end 41 located in a bearing 42 in casing 11 (see FIGURE 4). The other end 43 of shaft 40 is rotatively supported by bearing 44 in casing 11 and extends outwardly beyond the casing into a circular projection 45 on the casing. A coil spring 46 (see FIGURE 5) has one end 47 attached to shaft end 43 and its other end 48 attached to the inside of casing projection 45.

A first arm 50 extends to one side from shaft 40 and connects with the edge of disc 51 which is of substantially the same diameter as the end of channel A. The disc contains a plurality of holes 52 so that the disc acts as an impedance device resisting flow through channel A. A second arm 55 extends to the other side of shaft 40 and connects with the edge of a disc 56 which is of substantially the same diameter as the end of channel B. The disc 56 is substantially identical in construction to the disc 51 and contains a plurality of openings 57 so that it acts as an impedance device to produce resistance to flow through channel B.

The neutral condition of spring 46 exists when both discs are perpendicular to their respective flow channels as shown in FIGURE 1 and the opposing spring force increases with shaft displacement in either direction. The discs will be rotated slightly about shaft 40 when the fluid flows become unequal in channels A and B and will assume an angular position at which the spring force is equal and opposite to the difference in fluid forces on the two discs. The fluid flow through perforated disc 51 is subjected to a force $\rho F U_A^2$, where F is an effective area turn and $\rho$ is the density of the fluid. Also, the fluid flow through disc 56 is subjected to a force $\rho F U_B^2$ so that the differential force resisted by spring 46 is $\rho F(U_A^2 - U_B^2)$. The end 43 of shaft 40 carries a wiper arm 60 which bears against a potentiometer winding 61 and lead 62 (see FIGURE 6) from the wiper arm provides an analogue voltage representing the position of the shaft and the quantity $\rho F(U_A^2 - U_B^2)$.

Referring to the circuit schematic of FIGURE 6, the lead 62 connects to dividing circuit 63. The pulse outputs of pick-ups 36 and 37 representing $U_A$ and $U_B$, respectively, are connected with lines 65 and 66, respectively. Lines 65 and 66 contain digital-to-analogue or frequency-to-D.C. converters 67 and 68, respectively, to convert the pick-up pulse-rates to analogue signals. The lines 65 and 66 connect with a differential amplifier 69. The output of the amplifier 69 is $A(U_A - U_B)$ and this quantity is supplied to an electronic divider circuit 63, namely an electronic computer of hybrid or analogue type, through line 71. The function of circuit 63 is to serve as an on-line circuit which divides the measured quantity $\rho F(U_A^2 - U_B^2)$ by the measured quantity $U_A - U_B$ to obtain the quotient $\rho F(U_A + U_B)$ in analogue form as follows:

$$\frac{\rho F(U_A^2 - U_B^2)}{U_A - U_B} = \rho F(U_A + U_B)$$

This quotient appears in output line 72 of analogue or hybrid type electronic dividing circuit 63 and is the mass flowrate in analogue or digital form. Since the volume flowrate $(U_A + U_B)$ is also known, the density of the fluid can be obtained by using another electronic dividing circuit.

If it is desired to have a variable type of output rather than an analogue output, the vane 16 can be continuously revolved or oscillated continuously at known frequencies by a suitable power source (not shown) connected to shaft 20. Such movement continuously changes the distribution of flow and the velocities in channels A and B and the value of $\rho F(U_A^2 - U_B^2)$ developed by discs 51 and 56. Referring to the schematic circuit of FIGURE 7, the outputs of pick-ups 36 and 37 are connected to differential amplifier or add-substract counter 75 through lines 76 and 77, respectively, and the output of the differential amplifier or counter appears in line 78 as the varying numerical value of $A(U_A - U_B)$. This quantity continually changes at a rate and frequency determined by the rate and frequency of movement of vane 20. Also, the output of wiper 61 in line 79 is continually varying value of $\rho F(U_A^2 - U_B^2)$ because of the movement of vane 20. Since lines 78 and 79 connect with a digital dividing circuit 80; the numerical output in line 81 is a continuously varying value of $\rho F(U_A + U_B)$.

It is therefore apparent that the present invention provides a multiple purpose, high resolution flowmeter for liquid, gases and cryogenic fluids capable of indicating mass flowrate, density, volumetric flowrate and totalized flow. Because of the utilization of the differential flow, the effect of temperature and ambient effects or flow sensing (such as external vibration and acceleration) are minimized. The adjustable division of flow into two channels at different velocities permits the measurement of mass flow by sensing flow velocities, differential flow velocity and differential force (or torque). As previously stated, the amount of velocity differential can be adjusted by rotating vane 16 to any position or the vane can be continuously oscillated or rotated to achieve an alternating differential flow and velocity effect. While a restraining spring 46 has been shown to restrain shaft 40, other differential force measuring devices, such as an elastic shaft for the discs 51 and 56 in combination with a strain gauge, can be utilized to measure the force differential by utilizing the gauge to measure the torque generated strain in the elastic shaft. In either case, the movement or twist of the shaft is not large. Also, the perforated discs can be replaced by turbines or other suitable devices which serve as impedance to flow. The flow could be divided between more than two channels if desired to provide additional differential values. Unmagnetized blades for each turbine can be used when proximity type pick-ups are employed for pick-ups 36 and 37. Also the discs containing holes can be replaced by airfoil type lifting elements which produce lifting forces which can be matched against one another. Various other modifications and modes of operation of the invention are contemplated by those skilled in the art without departing from the spirit and scope of the invention as hereinafter defined by the appended claims.

What is claimed is:

1. A mass flowmeter comprising:
   a fluid passage;
   partition means for dividing said passage into two separate channels;
   regulating means upstream of said partition means for providing different flow velocities in said two channels;
   means for measuring a first quantity proportional to the differential flow velocity in said channels;
   means for measuring a second quantity proportional to the differential fluid force in said channels; and
   means for dividing said first quantity by said second quantity to obtain a quotient proportional to mass flowrate through said passage.

2. A mass flowmeter as defined in claim 1 wherein said first quantity measuring means comprises a volumetric flowmeter in each of said channels, and means connected to each of said volumetric flowmeters for substracting the output of one volumetric flowmeter from the output of the other flowmeter.

3. A mass flowmeter as defined in claim 1 wherein said second quantity measuring means comprises impedance means opposing flow through each of said channels and connected together to oppose one another and provide a differential force output.

4. A mass flowmeter as defined in claim 1 wherein said regulating means comprises a vane upstream of the channels.

5. A mass flowmeter comprising:
   a fluid passage;
   partition means for dividing said passage into two separate channels;
   regulating means upstream of said partition means for producing different flow velocities in said two channels;
   means for measuring the flow velocity in each channel and obtaining a first quantity proportional to the difference in the flow velocities;
   impedance means for producing an impedance to flow through each channel and for obtaining a second quantity proportional to the difference in fluid force in the two channels; and
   means for dividing the second quantity by said first quantity to obtain a quotient proportional to mass flowrate through said passage.

6. A mass flowmeter as defined in claim 5 wherein said impedance means comprises:
   first and second impedances each responsive to fluid flow through one of said channels;
   said impedances being connected together to be responsive to the differential fluid force acting thereon because of the different flow velocities in said channels; and
   means for sensing said differential fluid force on said impedances.

7. A mass flowmeter as defined in claim 6 wherein each of said impedances comprises a perforated disc located at the downstream end of one of said channels.

8. A mass flowmeter as defined in claim 6 wherein said impedances are connected to opposite sides of a supporting shaft to produce rotation of said shaft by said differential force, said resisting means being connected to said shaft.

9. A mass flowmeter as defined in claim 4 wherein said impedance means comprises first and second impedances for restricting the flow area of each channel to an effective area F, the fluid force on each impedance being $\rho F U^2$ where $\rho$ is the fluid density and $U$ is the flow velocity, said second quantity being $\rho F(U_A^2 - U_B^2)$ where subscripts A and B represent the two different channels.

10. A mass flowmeter as defined in claim 9 wherein said first quantity is $U_A - U_B$; said quotient being $$\rho F(U_A + U_B)$$

11. A mass flowmeter as defined in claim 5 wherein said regulating means comprises a movable vane for varying the differential flow velocity in said two channels.

12. A mass flowmeter as defined in claim 11 wherein said vane is fixed in position to provide a fixed velocity differential and said quotient is analogue form.

13. A mass flowmeter as defined in claim 11 having means for continually moving said vane means to provide said quotient in continuously variable form.

14. A mass flowmeter as defined in claim 5 wherein said flow velocity measuring means comprises separate turbine flowmeters in said channels.

References Cited by the Examiner
UNITED STATES PATENTS

| | | | |
|---|---|---|---|
| 720,188 | 2/1903 | Seidener | 73—194 |
| 2,620,659 | 12/1952 | Karcz | 73—203 X |
| 2,953,920 | 9/1960 | Machlanski | 73—196 |

RICHARD C. QUEISSER, *Primary Examiner.*

E. D. GILHOOLY, *Assistant Examiner.*